United States Patent Office.

PETER SPENCE AND FRANCIS M. SPENCE, OF MANCHESTER, COUNTY OF LANCASTER, ENGLAND.

MANUFACTURE OF ALUM.

SPECIFICATION forming part of Letters Patent No. 267,610, dated November 14, 1882.

Application filed July 3, 1882. (No specimens.) Patented in England December 24, 1881, No. 5,650; in Germany May 25, 1882, No. 22,273; in France May 25, 1882, No. 137,044; in Spain May 25, 1882, No. 32,187, and in Belgium May 25, 1882, No. 42,051.

*To all whom it may concern:*

Be it known that we, PETER SPENCE and FRANCIS MUDIE SPENCE, both of Manchester, in the county of Lancaster, Great Britain, manufacturing chemists, have invented a new and useful Improvement in the Manufacture of Alum, of which the following is a specification.

It is well known that soda-alum, if it could be economically made, would be applicable to most of the purposes for which ammonia and potash-alum have hitherto been used. Soda-alum, however, unlike potash and ammonia alum, is so largely soluble in the cold that a moderately-strong hot solution of it—say of 1.2 specific gravity—will, on cooling, yield no crystals at all; but if hot solutions of, say 1.35 specific gravity, are cooled, they become a magma with no distinct crystallization. If the magma remain soft and pasty and is allowed to stand for a time, varying from three days to a fortnight, the greater part of it will crystallize into soda-alum; but if the hot solution was of specific gravity 1.45, the amorphous mass forms and continues a hard, dry cake, and no crystals are formed. The crystals formed from the pasty mass are impure and generally dirty, and if again dissolved in water for purification, by recrystallization, the same difficulties are met with and render the process impracticable. In consequence of these difficulties soda-alum has not been made on the large scale, and has only been known as a chemical reagent in the laboratory. By means of our invention we are enabled to manufacture soda-alum with facility on a large commercial scale, which has hitherto been impracticable.

In carrying out our said invention we first form a solution of sulphate of alumina by any of the ordinary methods, taking care that the solution is as nearly free from dissolved oxide of iron as it can conveniently be got, and that it is almost free from uncombined sulphuric acid. To this solution we add as much sulphate of soda as is required to convert all the sulphate of alumina into soda-alum. The sulphate of soda may be added either while the solution is being made or after it is formed by acting upon calcined china, clay, shales, bauxite, or other suitable aluminous matters with dilute or strong sulphuric acid, as is well known, and the solution thus formed and containing the sulphate of soda (which, however, may be subsequently added) we now reduce in density, if needful, by adding water on the weak washings of the mud (to be subsequently referred to,) till it is about 50° of Twaddle's hydrometer at the boiling-point, or 1.25 specific gravity. We then run the solution into a deep settling-tank lined with lead, in which the liquor settles or becomes bright and free from mud, which falls to the bottom, and is afterward removed and washed. Part of this settled liquor is now run into one of the lead coolers, where the soda-alum is to be made or crystallized, and there it is allowed to cool, but it will yield scarcely any crystals. The remainder of the clear liquor and all subsequently made is run, as required, into an evaporating-vessel, where, by any suitable mode of boiling, it is brought up to the strength of 110° of Twaddel's hydrometer, or specific gravity 1.55. When this is reached the evaporation is stopped, and this now strong liquor is gradually run into the cooler among the weaker and cold liquor, previously mentioned. The contents of the cooler must be continuously stirred during this addition, and this stirring must be continued until the mixture is cooled down to 65° to 60° Fahrenheit. We would here point out that while the mixture is being made the heat of the mixed liquors must frequently be ascertained, and when the temperature rises to 100° to 105° Fahrenheit no more hot liquor should be added. If the mixed liquors on cooling run into the magma or cheesy form, more cold solution run in and stirred will insure perfect crystallization, for we have found that the most solid magma, if pounded up and mixed with a sufficiency of the cold solution, will gradually change into crystals; but we prefer to avoid that mode of working as inconvenient. When the mixed liquor has been stirred till cool enough it may then be run or boiled out into another similar cooler, where a further quantity of hot liquor of high density, as before, can be added to it and treated as before described, and so on. In the bottom of the first cooler, before named, will now be found a large deposit of crystals of soda-alum, and these we now place in deep draining hoppers or funnels, of any convenient size, lined with lead. A size we have found useful is about seven and a half feet in depth, four feet diameter at the top, and three feet at the bottom, provided with a loose and perforated bottom, to allow the liquor to drain from the said crystals. After remaining in the aforesaid draining-funnels from twelve to twenty-four hours the soda-alum crystals will have drained so as to be sufficiently dry to be packed in casks or bags to be sent out for use.

In place of the previously-described method of drying the crystals, above referred to, they may be dried by means of a centrifugal machine, as commonly used for draining or drying sugar in crystals. The mother-liquor, which is thus used over and over again as a cold solution of soda-alum, increases in quantity. Part of it must, therefore, be periodically removed, and we find it convenient to use such removed liquor in the coolers where potash-alum is being made, and thus economize the sulphate of alumina which it contains by converting such sulphate of alumina into potash-alum, and thus the mother-liquor is to some extent periodically removed and prevented from becoming foul.

We may here state that in practice we find it useful to mix about three parts of the cold solution of mother-liquor with one of the hot and strong liquor, of specific gravity 1.55, as described.

Having thus described and ascertained the nature of our said invention, and the manner in which the same is to be performed, we desire it to be understood that we claim as our invention—

The manufacture of soda-alum substantially as before described by mixing cold saturated solutions of said alum with stronger solutions of a higher temperature, as set forth, and so preventing the tendency of such solutions to solidify without crystallization, or, if solidified, to change this solid into the crystalline form by said mixture with the cold solution.

PETER SPENCE.
FRANCIS MUDIE SPENCE.

Witnesses:
ARTHUR C. HALL,
U. S. Consulate, 9 Mount St., Manchester.
W. T. CHEATHAM,
Patent Agent, 18 St. Ann's St., Manchester.